March 13, 1928.  
E. G. WERTENBERGER ET AL  
1,662,730  
TRUCK FOR BATHTUBS AND THE LIKE  
Filed Aug. 9, 1926
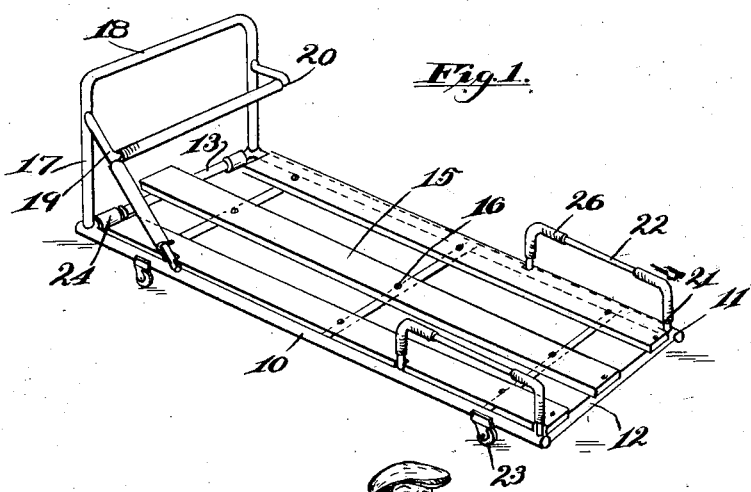
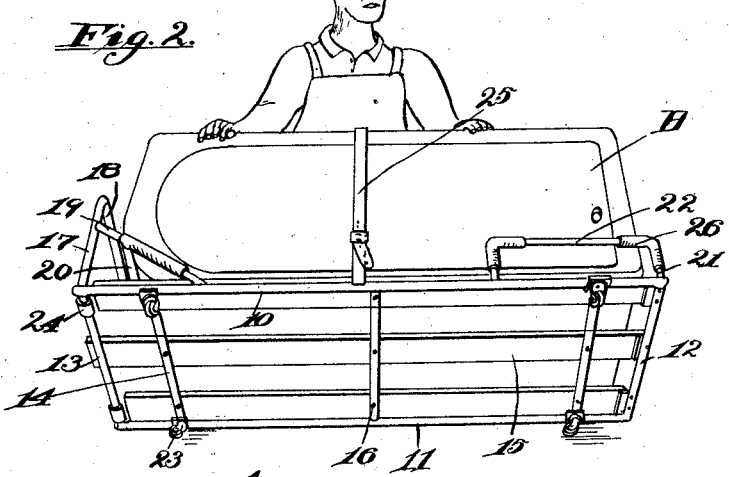
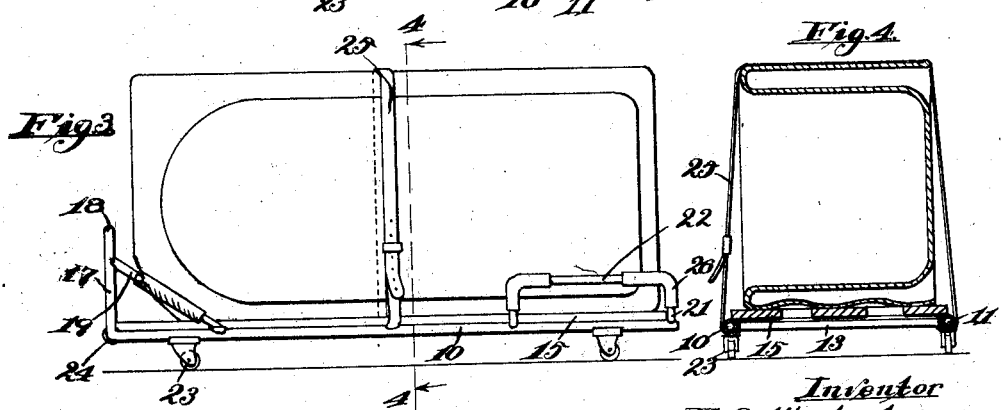

Patented Mar. 13, 1928.

1,662,730

UNITED STATES PATENT OFFICE.

EDWIN G. WERTENBERGER AND CLARENCE KLEIST, OF LOS ANGELES, CALIFORNIA.

TRUCK FOR BATHTUBS AND THE LIKE.

Application filed August 9, 1926. Serial No. 128,134.

This invention relates to improvements in hand trucks for transporting heavy articles, and particularly to a hand truck which has been primarily designed for carrying bath tubs to the desired location in a building.

An object of this invention is to provide a truck of novel construction which is simple and durable and which is so designed that a bath tub or similar heavy article can be easily placed thereon and removed therefrom.

Another object of this invention is to provide a hand truck having several safety features which will guard against the person using the truck becoming injured.

A further object of this invention is to provide a truck which is supported on caster wheels and which has on one of its ends rollers so that in moving the truck through narrow corridors or hallways, wherein there are sharp turns, the truck may be tipped up on end and will roll on the rollers, so that it can be caused to pass around such sharp corners.

With the foregoing and other objects in view which will be made manifest in the following detailed description and specifically pointed out in the appended claims, reference is had to the accompanying drawings for an illustrative embodiment of the invention, wherein:

Figure 1 is a perspective view of the improved truck,

Fig. 2 is a perspective view of the truck illustrating the construction on the under side thereof and showing the truck as being loaded and tipped preparatory to unloading, Fig. 3 is a side elevation of the truck illustrating the truck as being loaded, and Fig. 4 is a vertical section taken on the line 4—4 of Fig. 3.

Referring to the accompanying drawings wherein similar reference characters designate similar parts throughout, the improved truck consists of a floor provided as follows: There are two longitudinal side members 10 and 11 joined to each other at their ends by end transverse members 12 and 13. Intermediate transverse members 14 also serve to connect the longitudinal side members 10 and 11. A plurality of boards 15 are then placed on the floor frame thus provided and they are secured to the transverse members as by bolts 16 which preferably have their heads sunk into the boards. At one end of the floor there is provided an end wall having uprights 17 joined at their upper ends by an integral top bar 18. An inclined bar 19 has one end connected to the end wall at one side thereof and the other end connected to the longitudinal side member 10. An angular horizontal bar 20 has one end secured to the other side of the end wall and the other end fastened to the inclined bar 19. This horizontal bar 20 is disposed inwardly from the end wall over the floor for a purpose hereinafter to be described. At the opposite end of the floor there are provided handles, each handle having uprights 21 joined at their upper ends by top bars 22 preferably formed integral with the uprights.

All of the parts as above described with the exception of the boards and bolts are preferably formed of steel pipe or tubing for the sake of strength coupled with lightness. The various sections of steel pipe or tubing are preferably secured to each other as by welding. It will be understood, however, that any other suitable material can be employed and the particular manner in which the various parts are joined together may also be varied. The floor is normally supported upon caster wheels 23 which may be of any preferred construction. These caster wheels are four in number and are preferably located where the outer transverse members 14 are joined to the longitudinal side members 10 and 11. On the end transverse member 13 there are mounted two rollers 24, and these rollers are so arranged that when all of the four caster wheels 23 are resting on the floor, the rollers will be disposed above the floor. However, it is possible to tip the truck upon its end so that it will be supported solely by the rollers 24. If desired, a suitable strap 25 may be provided having one end fastened to one of the longitudinal side members and having the other adapted to be detachably connected to the other longitudinal side member.

The operation and advantages of the improved truck are as follows: As previously stated the truck has been primarily designed to transport bath tubs. The bath tub B is placed upon the truck and when so positioned one end of it will engage the horizontal bar 20. The other end is disposed between the handles on the other end of the truck. As clearly shown in Fig. 3 the horizontal bar 20 prevents the bath tub from shifting into contact with the horizontal top bar of the end wall. In transporting the bath tub, the workman frequently grasps the horizontal top bar 18 of the end wall to pull the truck about. If the horizontal bar 20 were not provided, the bath tub would be very apt to shift into contact with the top bar 18 and would be apt to injure the workman's hand placed thereon. In this way the horizontal bar 20 guards against such an accident in being so positioned that it will prevent the bath tub from engaging the top bar 18 of the end wall. Normally when the bath tub is placed on the truck, it is transported by allowing the truck to rest on the four caster wheels 23. In the event, however, that it is necessary to take the bath tub B through a narrow doorway or through a narrow corridor in which there is a turn, it may become necessary to tip the bath tub on end to get it through the doorway or around the turn in the corridor. When such is the case, the handles on the rear of the truck are grasped and are lifted, so that the truck will be completely supported by the rollers 24. While in this position the truck can be moved around the turn in the corridor very easily and after getting around the turn, it may be again lowered so that it will rest on the four caster wheels 23.

It will be understood that in loading the truck the bath tub is caused to rest on its side with the top of the tub being disposed toward the side of the truck having the inclined bar 19. In unloading the truck it is merely necessary to turn it over on that side having the longitudinal side bar 11, in which case the bottom of the tub will rest on the floor of the dwelling. By lifting the tub slightly, the handle which is on the longitudinal side bar 11 can be withdrawn from beneath the tub and this is the only part of the truck which is beneath the tub when the tub is caused to rest on its bottom on the floor.

As clearly shown upon the drawing, various parts of the truck are preferably taped or covered with padding, as indicated at 26, so that the tub will not be scratched by these metallic parts, and as the heads of the bolts 16 are sunk into the boards 15, these bolts will not scratch the tub.

From the above described construction it will be readily appreciated that an improved truck is provided of a novel construction which has been primarily designed for conveying bath tubs or similar large heavy articles. Furthermore, the truck is of simple and durable construction and has several safety features as well as advantages in not only transporting the article, but in loading and unloading it.

It will be understood that various changes may be made in the detail of construction without departing from the spirit and scope of the invention as defined by the appended claims.

We claim:

1. A truck of the class described comprising a truck floor mounted upon caster wheels, means providing an end wall on one end of the floor, an inclined bar secured to a side of the end wall and extending downwardly therefrom to the side of the floor, and a horizontal bar having one end secured to the other side of the end wall and the other end secured to the inclined bar, said horizontal bar being disposed inwardly from the end wall so as to keep articles placed on the truck from contacting with the end wall.

2. A truck of the class described comprising a truck floor mounted upon caster wheels, means providing an end wall on one end of the floor, handles upon the other end of the floor, an inclined bar secured to the side of an end wall and a horizontal bar having one end secured to the other side of the end wall, and the other end secured to the inclined bar, and rollers mounted on the floor at the base of the end wall, said rollers being so arranged that they will not engage the floor supporting the truck unless the truck is tilted endwise by the handles.

3. A truck of the class described comprising a truck floor supported by caster wheels, means providing an end wall on one end of the truck floor, an inclined bar secured to one side of the end wall and extending downwardly therefrom and secured to a side of the truck floor, an angular horizontal bar having one end secured to the other side of the end wall and having its other end secured to the inclined bar, handles mounted upon the sides of the truck floor adjacent the other end and extending upwardly therefrom, and rollers mounted upon the truck at the base of the end wall.

In testimony whereof we have signed our names to this specification.

EDWIN G. WERTENBERGER.
CLARENCE KLEIST.